(12) United States Patent
Hartimath et al.

(10) Patent No.: US 8,132,449 B2
(45) Date of Patent: Mar. 13, 2012

(54) PROCEDURE FOR DIAGNOSING AN EXHAUST GAS TREATMENT DEVICE AND DEVICE FOR IMPLEMENTING THE PROCEDURE

(75) Inventors: Shivanand Hartimath, Karnataka (IN); Peter Huebner, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 340 days.

(21) Appl. No.: 12/356,298

(22) Filed: Jan. 20, 2009

(65) Prior Publication Data
US 2009/0188309 A1    Jul. 30, 2009

(30) Foreign Application Priority Data
Jan. 24, 2008   (DE) .................. 10 2008 005 988

(51) Int. Cl.
*G01M 15/10* (2006.01)
(52) U.S. Cl. .................................................. 73/114.69
(58) Field of Classification Search ............. 73/114.69, 73/114.71, 114.75, 114.76
See application file for complete search history.

(56) References Cited

U.S. PATENT DOCUMENTS

| 7,850,918 | B2* | 12/2010 | Gross | 422/88 |
| 7,861,520 | B2* | 1/2011 | Broderick et al. | 60/286 |
| 2005/0251318 | A1* | 11/2005 | Wickert et al. | 701/108 |
| 2009/0013671 | A1* | 1/2009 | Cooke et al. | 60/286 |
| 2009/0113877 | A1* | 5/2009 | Van Nieuwstadt | 60/286 |
| 2009/0192732 | A1* | 7/2009 | Huebner | 702/50 |
| 2009/0248359 | A1* | 10/2009 | Lin et al. | 702/182 |
| 2009/0301067 | A1* | 12/2009 | Dingle et al. | 60/286 |

FOREIGN PATENT DOCUMENTS

| DE | 101 39 142 | 2/2003 |
| DE | 10 2004 022 114 | 11/2005 |
| DE | 10 2004 022 115 | 11/2005 |
| DE | 10 2004 043 366 | 3/2006 |
| DE | 10 2004 044 506 | 3/2006 |
| DE | 10 2005 001 119 | 7/2006 |

* cited by examiner

*Primary Examiner* — Eric S McCall
(74) *Attorney, Agent, or Firm* — Merchant & Gould, P.C.

(57) ABSTRACT

Procedures for diagnosing an exhaust gas treatment device, which is dosing a reagent into the exhaust gas area of a combustion process, whereby the reagent is brought up to a dosing pressure and subsequently dosed, at which the diagnosis is undertaken with the aid of an evaluation of a pressure drop of the reagent, and a device for implementing the procedure are suggested. After turning off the pump a pressure drop that occurs afterwards is evaluated. The evaluation of the pressure drop considers a leakage loss of the pump.

12 Claims, 8 Drawing Sheets

PROCEDURE FOR DIAGNOSING AN EXHAUST GAS TREATMENT DEVICE AND DEVICE FOR IMPLEMENTING THE PROCEDURE

TECHNICAL FIELD

The invention is based on a procedure for diagnosing an exhaust gas treatment device and on a device for implementing the procedure according to the category of the independent claims.

A control unit program and a control unit program product are also subject matter of the present invention.

BACKGROUND

DE 101 39 142 A1 describes an exhaust gas treatment device of a combustion engine, at which a SCR-catalyzer (selective catalytic reduction) is used for reducing the NOx emissions, which reduces the nitrous gases that are contained in the exhaust gas with the aid of the reducing agent ammoniac to nitrogen. The ammoniac is won from a urea water solution that has been sprayed into the exhaust gas area upstream before the SCR-catalyzer in the exhaust gas area of the combustion engine. The urea water solution that has been stored in a storage tank is brought to a default dosage pressure with a pump. For dosing the urea water solution depending on the demand a dosage valve is provided, which is set to a default flow rate.

DE 10 2004 044 506 A1 describes a procedure and a device, at which a reagent that is subject to pressure is also introduced into the exhaust gas of a combustion engine before a SCR-catalyzer. The familiar system uses compressed air for supporting the introduction process, which is conducted through a check valve that provides an opening pressure. A diagnosis of the compressed air pressure is provided, which begins at a starting point of the diagnosis with the closing of the compressed air control valve. It is checked at least at a second point of time, whether the compressed air pressure corresponds with at least one lower threshold, which almost corresponds with the opening pressure of the check valve that has been added to the ambient air pressure. An error signal is provided if the condition is not fulfilled.

DE 10 2005 001 119 A1 describes a procedure and a device, which provide the introduction of an oxidized reagent in form of fuel into the exhaust gas area of a combustion engine upstream before an exhaust gas treatment device, which for example contains an oxidation catalyzer, a particle filter, a NOx-storage catalyzer and/or a SCR-catalyzer, whereby the exhaust gas treatment device or at least part of it shall be heated. A diagnosis of the exhaust gas treatment device is provided by a controlling of the reagent pressure. The reagent pressure that is measured between a reagent safety valve and a reagent metering valve is determined during different conditions of the reagent safety valve and/or the reagent metering valve and is the compared with at least one threshold value. If a threshold is exceeded an error signal is provided.

DE 10 2004 043 366 A1 describes a procedure and device, which again provide the introduction of an urea water solution as an reagent that is subject to pressure into the exhaust gas of a combustion engine upstream before a SCR-catalyzer. An acquainted system provides a supporting of the introduction process by compressed air. The urea water solution that is subject to pressure is conducted into the exhaust gas area of the combustion engine over an introduction pipe. A diagnosis is provided, which checks, whether the introduction pipe is blocked completely or at least partially. The diagnosis is started at a starting time by reducing the reagent pressure as well as the compressed air pressure. The time course of the reagent pressure that has been determined after the starting time is checked with regards to whether a reagent pressure drop occurred. The time course that has been determined after the starting time is also checked with regard to whether compressed air pressure drop occurred. An error signal is provided if the reagent pressure drop as well as the compressed air pressure drop do not fall below a threshold value.

DE 10 2004 022 115 A1 again describe a procedure and a device, which provide the introduction of an urea water solution as a reagent that is subject to pressure into the exhaust gas of a combustion engine upstream before a SCR-catalyzer. This familiar system also provides a supporting of the introduction process by compressed air. A diagnosis of at least one pressure sensor is implemented, whereby a pressure sensor can be arranged in the reagent path as well as in the compressed air path. Ii is checked in at least a first time interval, in which a stationary pressure condition shall occur, whether the pressure signal corresponds at least almost with the stationary pressure. It is checked in at least a second time interval, in which a pressure change occurs, whether the pressure signal almost corresponds with a preset control pressure and/or whether a preset change towards the stationary pressure nearly occurred. An error signal is provided if at least one of the conditions is not fulfilled.

The invention is based on the task to provide a procedure for diagnosing an exhaust gas treatment device and a device for implementing the procedure, which provide a reliable diagnosis result.

The task is solved by the measures that are mentioned in the independent claims.

SUMMARY

The initial point of the invention is an exhaust gas treatment, which is dosing a reagent into the exhaust gas area of a combustion process for example in the exhaust gas of a combustion engine, whereby the reagent is brought to a dosing pressure by a pump and is dosed afterwards. The diagnosis is undertaken with the aid of an evaluation of a pressure drop of the reagent. The invention distinguishes itself in that the pump turns off, the afterwards occurring pressure drop is evaluated and a leakage loss of the pump is considered when evaluating the pressure drop.

The invention realizes that a low-cost feasible pump, which fulfills the stated requirements, can provide a leakage loss. The consideration of the leakage loss of the pump increases the reliability of the diagnosis, which especially originates from the fact that criteria for evaluating the pressure drop having regard to the leakage loss can be narrowed down. An erroneous diagnosis, which is based for example on an overvaluation of an increased pressure drop, can be thereby eliminated. An unnecessary exchange of components of the exhaust gas treatment device, for example of the pump, of conductions and/or of valves can be avoided.

A leakage loss of the pump can especially occur when an overflow valve is used in the pump for controlling the pump pressure. In this case it always has to be counted on an at least partially opened overflow valve when reaching the default dosage pressure. When turning off the pump the overflow valve is generally at least partially opened, so that a leakage loss occurs due to that, which can be noticed by a pressure drop at the beginning of the diagnosis after turning off the pump and which is considered at the evaluation of the pressure drop.

Generally a leakage loss can be considered thereby that based on the dosage pressure a low diagnosis starting pressure is determined and when it is reached the evaluation of the following pressure drop begins and/or that the diagnosis starting pressure is considered at the determination of a criteria, especially at the determination of a threshold value.

Advantageous improvements and embodiments of the invention accrue from dependent claims.

After turning off the pump the pressure drop can be performed within a diagnosis dose operation or for example at a turned-off dosage. At a completely prevented dosing an additional pressure drop having regard to the leakage loss indicates a leak, which can be caused for example by a metering valve, which jams while opened. But the diagnosis is also possible within the diagnosis dose operation, whereby it is assumed that a pressure drop can be expected during the diagnosis dose operation. As long as the expected pressure drop does not occur, a defect of the metering valve for example can be assumed, which jams while closed or which is at least partially afflicted by the reagent that has to be dosed. The different procedures after the turning off the pump can be used furthermore for making the diagnosis results plausible.

According to an embodiment it is provided that the leakage loss of the pump is considered by a pressure drop constant.

Alternatively the leakage loss can be considered by a waiting time after turning off the pump. The waiting time shall be assessed hereby in such a way that the process, which causes the leakage loss of the pump, is substantially faded away.

Alternatively the leakage loss of the pump can be considered by the detection of the gradient of the pressure drop and by a comparison with a pressure gradient threshold value, which has to be fallen below.

Furthermore the leakage loss can be considered by opening a bypass valve of the pump. By opening a bypass valve the reagent pressure can be reduced before the evaluation of the pressure drop to a dose, at which the process, which causes the leakage loss of the pump, is substantially faded away.

One embodiment provides that the evaluation of the pressure drop provides a comparison of the measured reagent pressure with a pressure threshold. The pressure threshold is preferably determined variably depending on the actually present operating conditions at the beginning of the diagnosis, whereby the reliability of the diagnosis is increased.

An improvement of this embodiment provides the determination of the threshold depending on a diagnosis starting pressure, which can be determined according to one of the above mentioned different procedures. Additionally the threshold is preferably determined depending on a preset diagnose pressure difference.

One embodiment provides that the reagent amount that is eventually provided at the diagnosis dosing operation is summed up until a dosage amount threshold is reached and that the diagnosis dosing operation is ended when the dosage amount threshold is reached. With this measure a possible influence of the dosing amount onto the diagnosis result can be minimized.

A further improvement provides that a leakage of the exhaust gas treatment device outside the diagnosis dosing operation is detected by the evaluation of the pressure drop.

The device according to the invention for implementing the procedure concerns firstly a customized control unit, which contains instruments for implementing the procedure.

The control unit contains preferably at least one electric storage, in which the procedure steps are stored as a control unit program.

The control unit program according to the invention provides that all steps of the invention are implemented when it runs in a control unit.

The control unit program product according to the invention has a program code stored on a machine readable medium and performs the procedure according to the invention when the program runs in a control unit.

Further advantageous improvements and inventions of the invention accrue from further dependent claims. Embodiments of the invention are described in the drawings and further explained in the following description.

DETAILED DESCRIPTION

Figure 1:
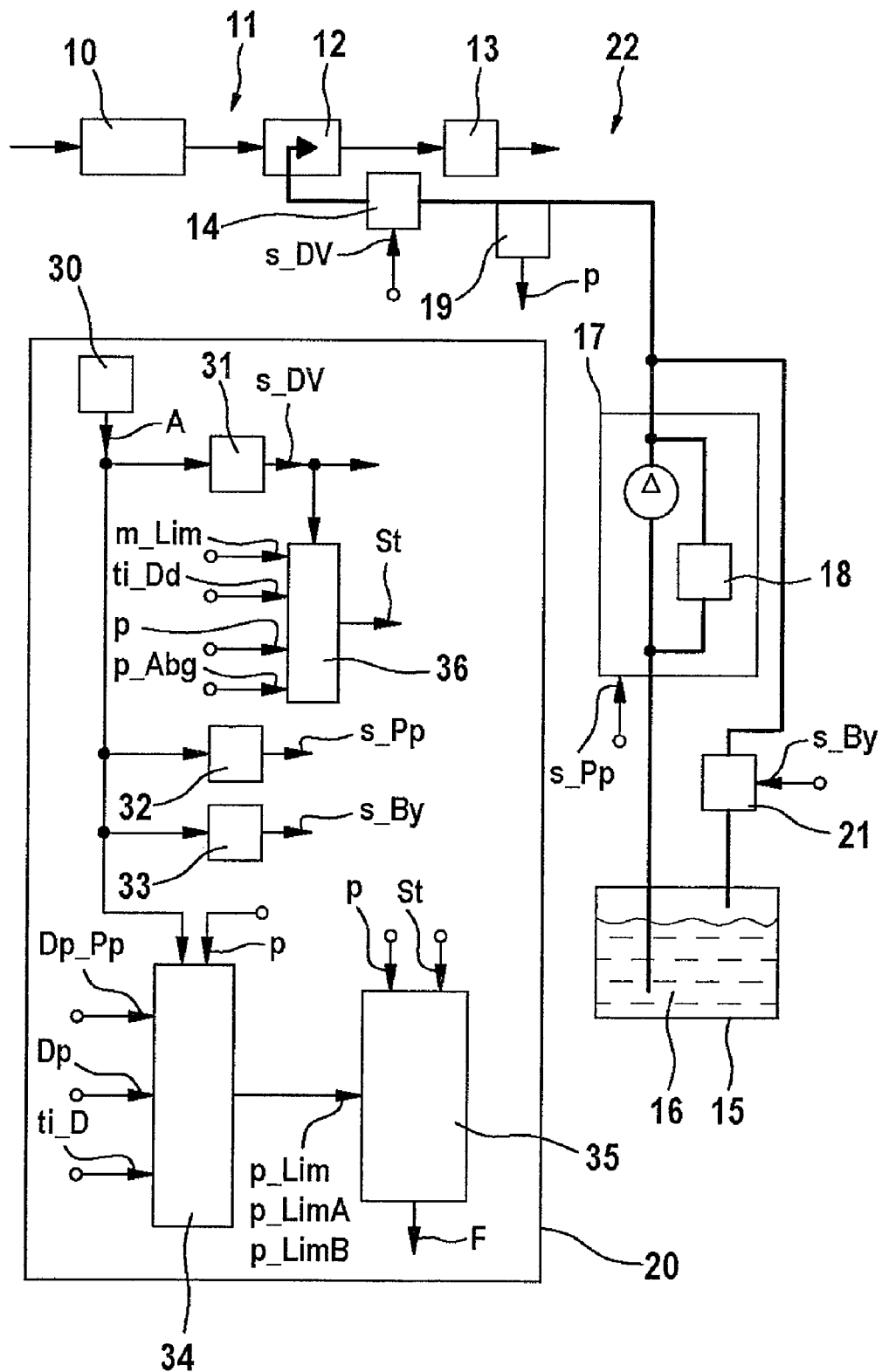
FIG. 1 shows a technical environment, in which a procedure according to the invention is running.

FIG. 1 shows a combustion engine 10, in whose exhaust gas area 11 a reagent introduction device 12 and upstream after the reagent introducing device 12 an exhaust gas treatment device 13 are arranged. The reagent introduction device 12 is connected to a metering valve 14, which is controlled by a metering valve control signal s_DV. The metering valve 14 determines the dosing rate of a reagent 16 that is stored in a reagent tank 15. The reagent 16 is brought to a reagent pressure p, which is detected by a pressure sensor 19, by a pump 17, which contains an overflow valve 18.

A control unit 20 is supplied with the reagent pressure p, which provides the metering valve control signal s_DV, a pump signal s_Pp as well as a bypass valve control signal s_By. The bypass valve control signal s_By is provided to a bypass valve 21, which can be used for a pressure decay of the reagent pressure p downstream after the pump 17, whereby the reagent is lead back into the reagent tank 15.

The reagent introducing device 12, the exhaust gas treatment device 13, the metering valve 14, the reagent tank 15, the pump 17 as well as the bypass valve 18 are components of the exhaust gas treatment device 22, which are provided for the purification of the exhaust gas of a combustion process, for example of a combustion process of at least one component that takes place in a combustion engine 10.

The exhaust gas treatment device 22 can be provided for example for removing nitrous gases from the exhaust gas of the combustion engine 10, whereby the exhaust gas treatment device 13 is especially realized as a SCR-catalyzer, which reduces for example nitrous gases with the reagent ammoniac. The ammoniac can be sustained in the exhaust gas area 11 by a hydrolysis of an urea water solution. In such a case the urea water solution is a preliminary stage of the reagent 16, which is nevertheless called the reagent 16 in the following.

Depending on the specific embodiment especially of the exhaust gas treatment device 13 of the exhaust gas treatment device 22 an oxidizable reagent as fuel for example can be used as a reagent.

The control unit 20 contains a diagnosis control 30, which provides a request signal A, when the diagnosis shall be started. The request signal A influences a dosing signal determination 31, which provides the metering valve control signal s_DV. The request signal A influences furthermore a pump control 32, which provides the pump control signal s_Pp. Furthermore the request signal A influences a bypass valve control 33, which provides the bypass valve control signal s_By. Moreover the request signal A is lead to a threshold determination 34, which determines at least one threshold value from incoming signals.

The reagent pressure p, a leakage loss constant Dp_Pp, a diagnosis pressure difference Dp and a waiting time ti_D are provided as incoming signals of the threshold determination 34. The threshold determination 34 determines a pressure threshold p_Lim, p_LimA, p_LimB.

The pressure threshold p_Lim, p_LimA, p_LimB is provided for a comparator 35, which compares the reagent pressure p with the pressure threshold p_Lim, p_LimA, p_LimB in the case of a present diagnosis stopping signal St and provides an error signal F if necessary.

The diagnosis stopping signal St provides a stopping signal constant 36 depending on the metering valve control signal s_DV, a dosing amount threshold m_Lim, a diagnosis time ti_Dd, the reagent pressure p as well as an exhaust gas pressure p_Abg that occurs in the exhaust gas area 11.

Figure 2:
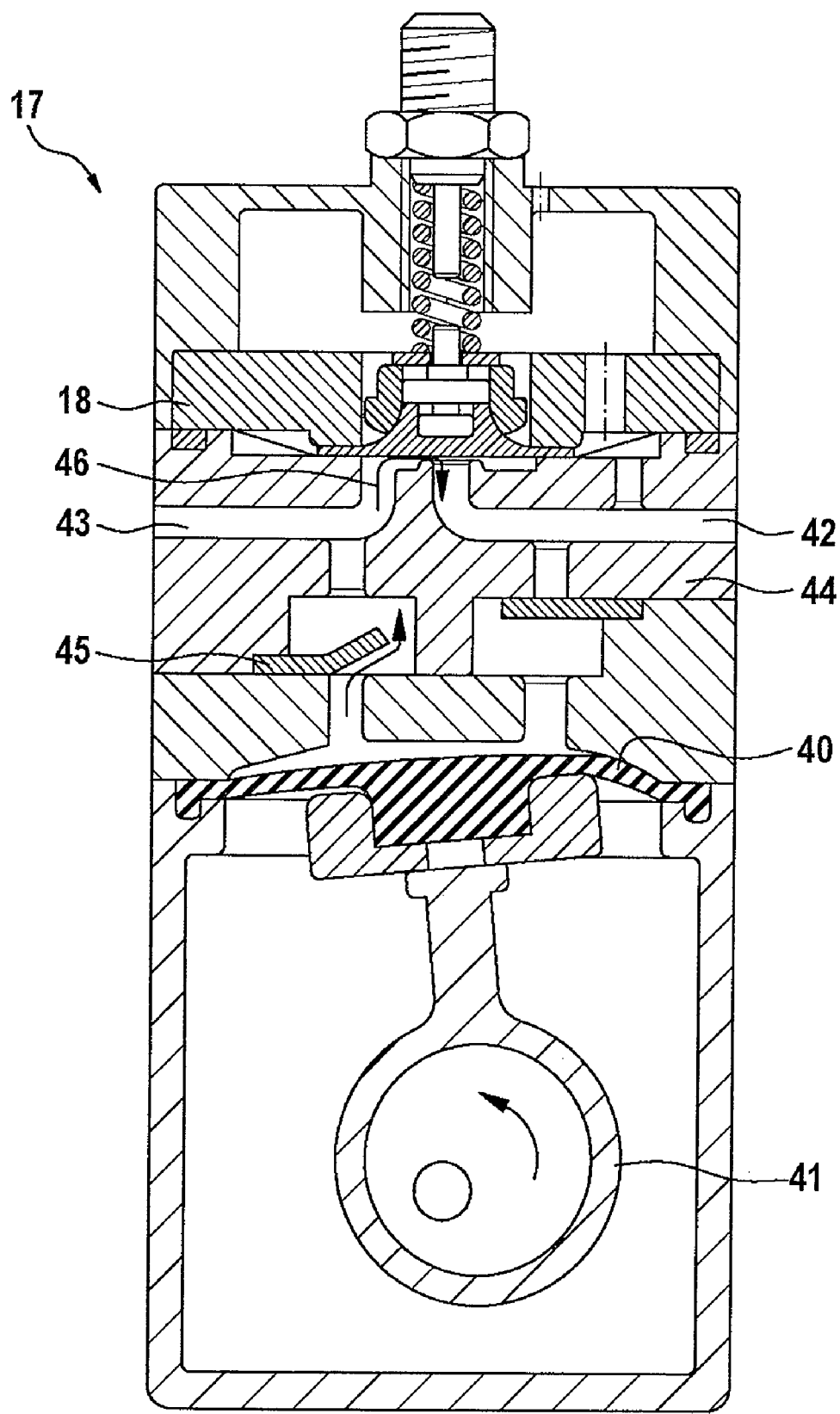
FIG. 2 shows a membrane pump, at which a leakage loss can occur.

The pump 17 that is shown in FIG. 1, which contains the overflow valve 18, is shown in more detail in FIG. 2. The pump 17 is realized as a membrane pump, whose membrane 40 is driven by an eccentric drive 41 in such a way, that the reagent 16 is pump from the entrance 42 to the exit 43 of the pump 17, whereby the reagent pressure p occurs at the exit 43. The stream directions are preset by a first and a second control valve 44, 45.

The pump 17 contains an overflow valve 18, which opens when reaching the preset regular reagent pressure p in the dosing operation, so that an overflow 46 can take place at the entrance 42. According to the pump 17 that is shown in the embodiment of FIG. 2 the overflow valve 18 is realized as a membrane, which is tensioned against a spring. The pump 17 is usually so dimensioned that an overflow 46 always occurs during the pump operation.

After turning off the pump 17 the overflow valve 18 does not close abruptly, so that an overflow 46 is still occurring, which decreases during the closing process. The overflow 46 can be noticed in the reagent pressure p as a leakage loss so long until the overflow valve 18 is completely closed, because the turning off of the pump 17 is a dynamic process, at which the reagent pressure p at the exit 43 as well as the reagent pressure p at the entrance 42 are changing constantly during the closing process of the overflow valve 18.

Figure 3A:
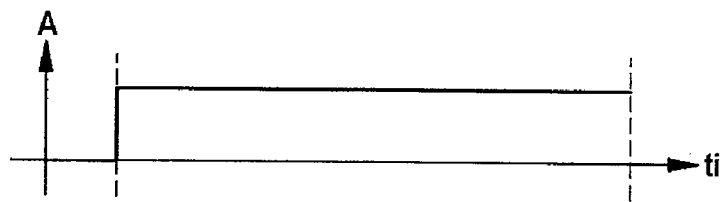
FIGS. 3a-3e show signal courses depending on the time, at which the leakage loss is considered by a leakage loss constant within a diagnosis dosing operation.

The procedure according to the invention is explained further with the aid of the signal courses depending on the time that are shown in FIGS. 3a-3e, 4a-4d, 5a-5e, 6a-6d, 7a-7f and 8a-8e:

FIG. 3a shows the request signal A depending on the time ti. The request signal A provides the diagnosis request 30 for example within an on-board diagnosis that required by law.

Figure 3B:
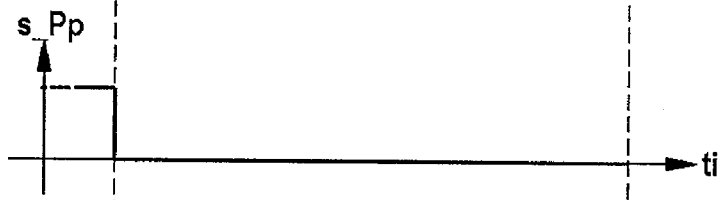
Figure 3C:
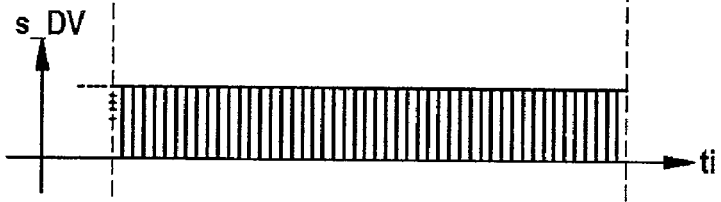

With the occurrence of the request signal A at a diagnosis starting point ti_S the pump control signal s_Pp that is shown in FIG. 3b is determined in such a way that the pump 17 is turned off. The metering valve control signal s_DV that is shown in FIG. 3c is determined in such a way that a preset diagnosis dosing operation is started. The shading of the signal course that is shown in FIG. 3c shall imply that an operation of the metering valve 14 that is in time is provided for the exact setting of the flow rate during the diagnosis dosing operation.

Figure 3D:
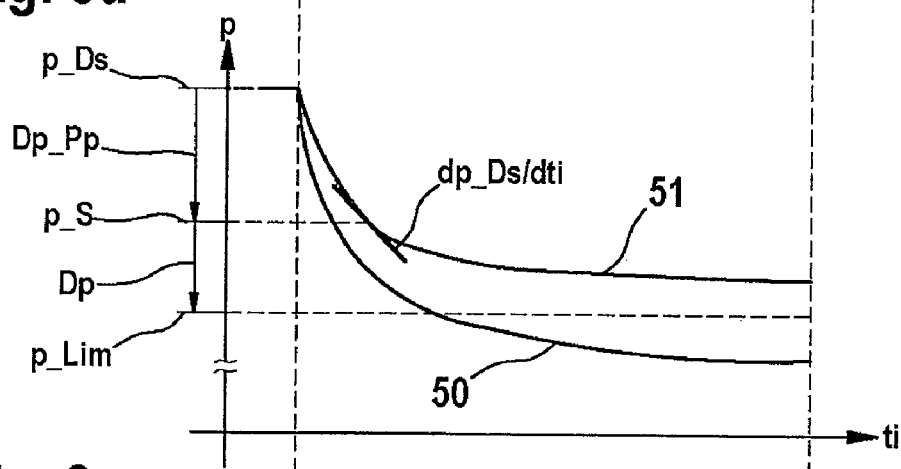

FIG. 3d shows the reagent pressure p, which shows a pressure drop 50, 51 after the diagnosis starting point ti_S. The pressure drop 50, 51 that occurs due to the diagnosis dosing operation is overlaid by the leakage loss of the pump 17 at the beginning of the diagnosis, which can be noticed by an additional pressure loss.

According to a first embodiment the leakage loss of the pump 17 is considered by the leakage loss constant Dp_Pp in the threshold determination 34. The leakage loss constant Dp_Pp is substracted at the beginning of the diagnosis to the diagnosis starting point ti_S from the regular dosing pressure p_Ds, whereby this results in the diagnosis starting pressure p_S.

Based on the determined diagnosis starting pressure p_S and preferably with regard to the default diagnosis pressure difference Dp the threshold determination 34 determines the pressure threshold p_Lim, so that the leakage loss constant Dp_Pp is considered at the determination of the pressure threshold value p_Lim. Additionally or alternatively the leakage loss can be considered thereby that the evaluation of the pressure drop 50, 51 takes place not before the reagent pressure p falls below the leakage loss constant Dp_Pp.

According to another embodiment the leakage loss of the pump 17 is thereby considered that the evaluation of the pressure drop 50, 51 is not undertaken before a diagnosis starting pressure p_S, which is determined with the aid of the determination of the pressure gradient dp_Ds/dti. As long as the pressure gradient dp_Ds/dti falls below a not shown gradient threshold value, the diagnosis starting pressure p_S is determined and the pressure threshold p_Lim is defined based on the diagnosis starting pressure p_S preferably with regard to the preset diagnosis pressure difference Dp. The diagnosis pressure difference Dp can deviate from the diagnosis pressure difference according to the previous embodiment.

Figure 3E:
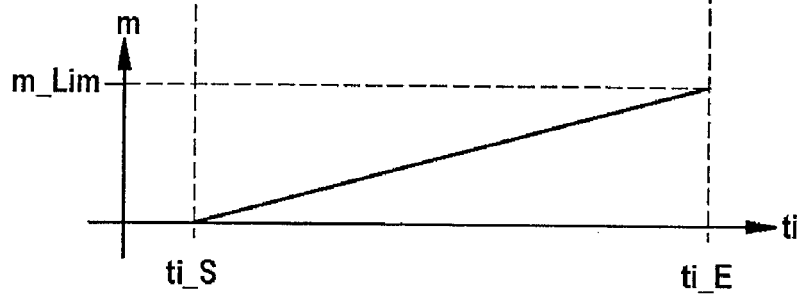

These two embodiments are based on the fact that according to FIG. 3e the diagnosis dosing operation has been undertaken already at the diagnosis starting time ti_S. but it is also possible in the first as well as in the second embodiment that the diagnosis dosing operation is not started before the reagent pressure p reaches the diagnosis starting pressure p_S.

FIG. 3d shows a drop 50 of the reagent pressure p, which lies below the pressure threshold p_Lim at a diagnosis stopping time ti_E. furthermore a drop 51 of the reagent pressure p is shown, which runs always above the pressure threshold p_Lim. Hereby the pressure drop 50 corresponds with an expected pressure drop, at which the reagent pressure p falls below the pressure threshold p_Lim. In this case it is assumed that the metering valve 14 is working properly and is not blocked or also not blocked partially. The pressure drop 51 on the other hand corresponds with a pressure drop, at which it is assumed that the metering valve 14 is at least partially blocked.

The diagnosis stopping time ti_E is provided by the stopping signal detection 36, when the dosing amount m reaches a default dosing amount threshold m_Lim during the diagnosis dosing operation. The stopping signal detection 36 integrates the metering valve control signal s_DV for calculating the dosing amount m according to FIG. 3e, whereby the reagent pressure p can be considered as a first correction parameter and the exhaust gas pressure p_Abg for example as a second correction parameter.

Alternatively the stopping signal detection 36 provides the diagnosis stopping time ti_E after the lapse of the preset diagnosis time ti_St.

With the provision of the diagnosis stopping signal St at the diagnosis stopping time ti_E the diagnosis and therefore the evaluation of the pressure drop 50, 51 is finished. The comparator 35 provides the error signal F, when the reagent pressure p has shown a course according to the pressure drop 51, at which the pressure threshold p_Lim has not been fallen below until reaching the diagnosis stopping time ti_E.

Figure 4A:
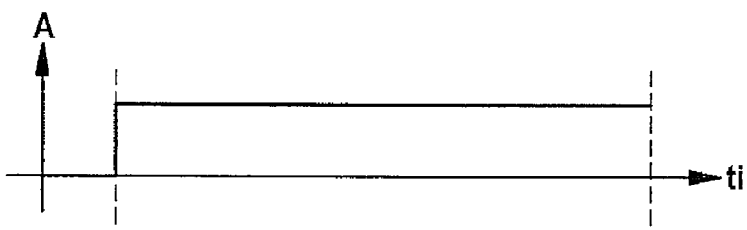
FIGS. 4a-4d show signal courses depending on the time, at which the leakage loss is considered by a leakage loss constant without a diagnosis dosing operation.
Figure 4B:
Figure 4C:

The embodiment that is shown in FIGS. 4a-4e assumes that after turning off the pump 17 no diagnosis dosing operation is provided at the diagnosis starting time ti_S, so that the metering valve control signal s_DV is stays turned off or is turned off according to FIG. 4c.

When the pressure drop 50 according to FIG. 4d falls below the threshold value p_Lim until the diagnosis stopping time ti_E at this procedure, a leak in the exhaust gas treatment device 22 has to be assumed, which arises for example from a metering valve 14 that clamps in an opened status. If on the other hand the drop pressure 51 according to FIG. 4d occurs, at which no further pressure drop occurs after the abatement of the pressure drop caused by the leakage loss, an erroneous exhaust gas treatment device 22 can be assumed.

Figure 4D:
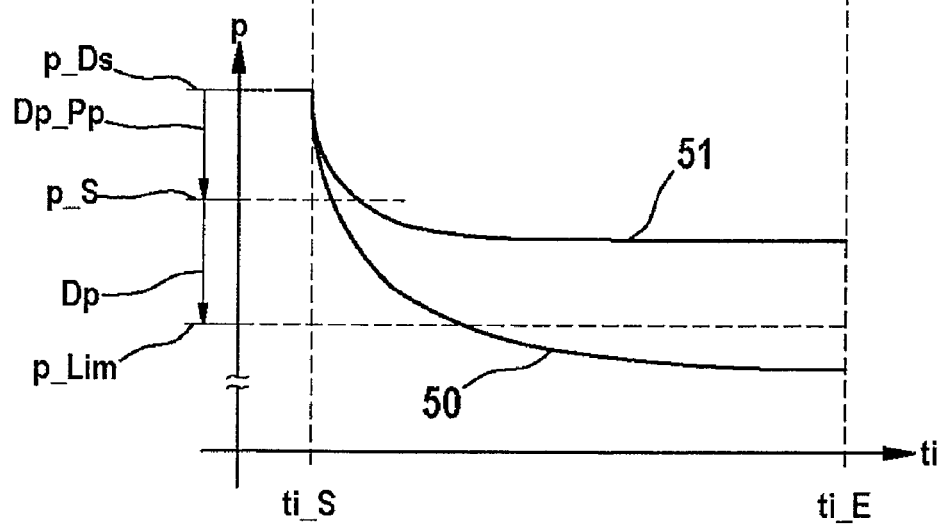

Because the diagnosis results are reversed with a diagnosis dosing operation and without a diagnosis dosing operation regarding the pressure drops 50, 51 according to FIGS. 3d and 4d, a rendering plausible can be undertaken by a diagnosis course for one thing within the diagnosis dosing operation and for another thing without the diagnosis dosing operation.

Figure 5A:
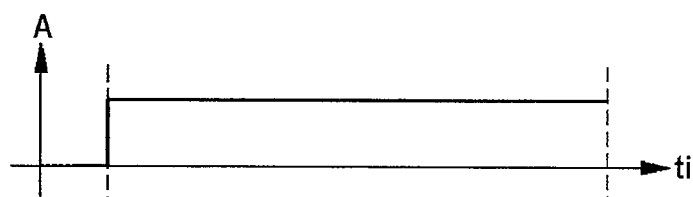
FIGS. 5a-5e show signal courses depending on the time, at which the leakage loss is considered by a waiting time within a diagnosis dosing operation.
Figure 5B:

According to a further embodiment the leakage loss of the pump 17 is considered by the default of the waiting time ti_D. the process is further described in FIGS. 5a-5e, whereby FIGS. 5a and 5b correspond with FIGS. 3a and 3b.

After the beginning of the diagnosis at the diagnosis starting time ti_S the waiting time ti_D is provided, which is determined in such a way that the influence of the leakage loss of the pump 17 on the drop of the reagent pressure p is eliminated completely or at least partially. Preferably the waiting time ti_D is determined experimentally. According to FIG. 5c the metering valve control signal s_DV is determined for example not until after the waiting time ti_D is over in such a way that the diagnosis doing operation begins.

Figure 5C:
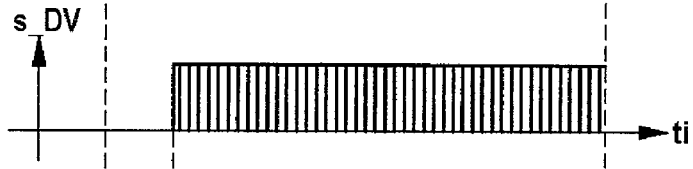
Figure 5D:
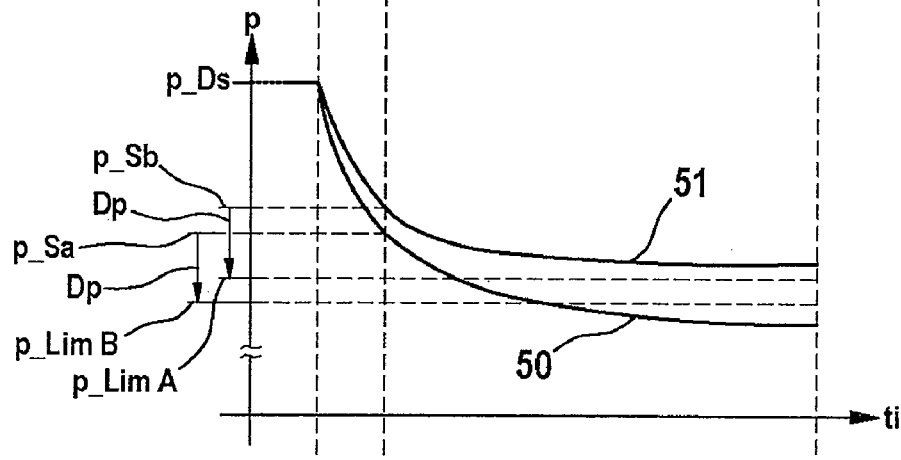

FIG. 5d shows two pressure drops 50, 51, whereby again pressure drop 51 causes the provision of an error signal F. after the waiting time ti_D is over a diagnosis starting pressure p_Sa occurs at a pressure drop 50 and a diagnosis starting pressure p_Sb at a pressure drop 51, whereby the diagnosis pressure p_Sb is higher than the other diagnosis starting pressure p_Sa due to the pressure drop 51.

Based on the diagnosis starting pressure p_Sa, p_Sb the pressure threshold p_LimA, p_LimB is each determined by a subtraction of the diagnosis pressure difference Dp. Depending on the diagnosis starting pressure p_Sa, p_Sb different diagnosis pressure differences Dp can be preset. Furthermore the diagnosis pressure difference Dp can deviate according to this embodiment from the diagnosis pressure difference Dp of the previous embodiments.

Figure 5E:
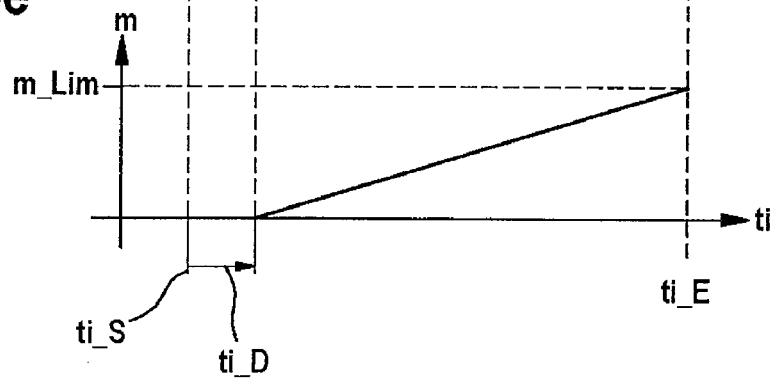

The diagnosis according to this embodiment is also ended and the evaluation of the pressure drop 50, 51 is over when the diagnosis stopping time ti_E occurs when reaching the dosing amount threshold m_Lim with the occurrence of the diagnosis stopping signal St. the signal courses that are shown in FIGS. 5c and 5e it has been assumed that the diagnosis dosing operation is not undertaken until the waiting time ti_D is over. In principal it is also possible to enable the diagnosis dosing operation already at the diagnosis starting time ti_S.

The embodiment that is shown in FIGS. 6a-6d assumes that after turning off the pump 17 at the diagnosis starting time ti_S no diagnosis dosing operation is provided. If at this way of proceeding the pressure drop 50 according to FIG. 6d falls below the threshold p_Lim until the diagnosis stopping time ti_E, a leak in the exhaust gas treatment device 22 can be assumed. If on the other hand a pressure drop 51 according to FIG. 6d occurs, at which after the abatement of the pressure loss caused by the leakage loss no further pressure drop occurs, an erroneous exhaust gas treatment device 22 can be assumed.

Figure 6A:
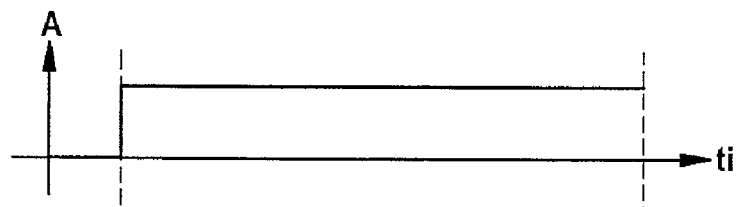
FIGS. 6a-6d show signal courses depending on the time, at which the leakage loss is considered by a waiting time without a diagnosis dosing operation.
Figure 6B:
Figure 6C:
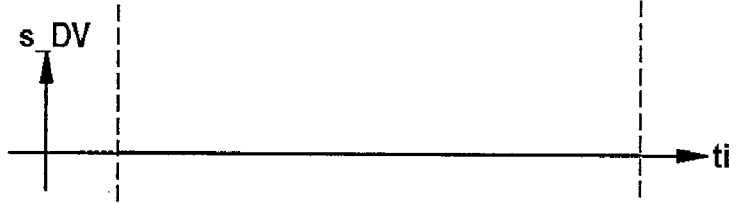
Figure 6D:
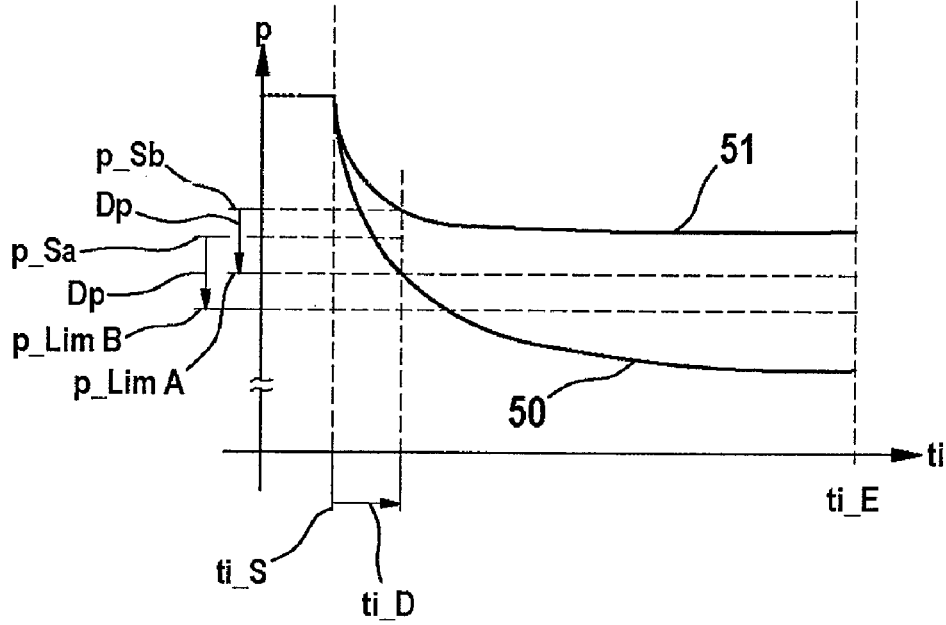

Because the diagnosis results act reversely with a diagnosis dosing operation and without a diagnosis dosing operation regarding the expected pressure drop 50, 51 according to FIGS. 5d and 6d, a rendering plausible can be undertaken by a diagnosis course for one thing within the diagnosis dosing operation and for another thing without the diagnosis dosing operation.

According to the next embodiment the leakage loss of the pump 17 is considered at a purposeful pressure drop in the pump 17 and therefore the reagent pressure p with the aid of the bypass valve 21.

After beginning the diagnosis at the diagnosis starting time ti_S the controlling of the bypass valve 21 is provided by the bypass valve control signal s_By. Thereby the diagnosis starting pressure p_S is set in such a way that the leakage loss of the pump 17 is almost completely eliminated by a fast closing of the overflow valve 18.

The bypass valve 21 is controlled by a specific bypass valve control time ti_By. Preferably the bypass valve control time ti_By is determined experimentally. FIG. 7e shows again two pressure drops 60, 61, whereby pressure drop 61 causes the provision of the error signal F. the steep beginning of both pressure drop 60, 61 is caused by the short bypass valve control time ti_By.

The diagnosis pressure difference Dp can be determined independently from the diagnosis starting pressure p_S, so that the pressure threshold p_Lim varies correspondingly depending on the initial operation situation. The diagnosis pressure difference Dp can deviate according to this embodiment from the diagnosis pressure differences Dp of the previous embodiments due to the changed initial situation at the beginning of the evaluation of the pressure drop 60, 61.

According to this embodiment the diagnosis is also ended at the diagnosis stopping time ti_E and the evaluation of the pressure drop 60, 61 is finished when the diagnosis stopping signal St is provided by the stopping signal determination 36.

Figure 7A:
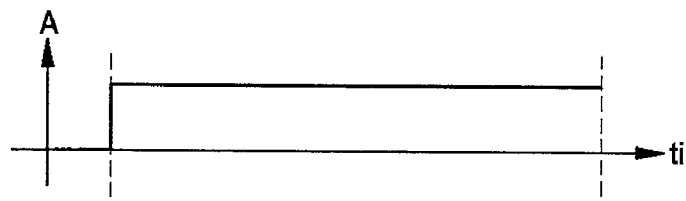
FIGS. 7a-7f show signal courses depending on the time, at which the leakage loss is eliminated by a bypass valve within a diagnosis dosing operation.
Figure 7B:
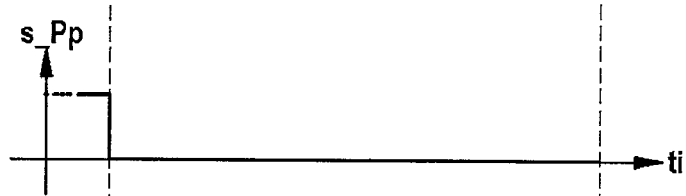
Figure 7C:
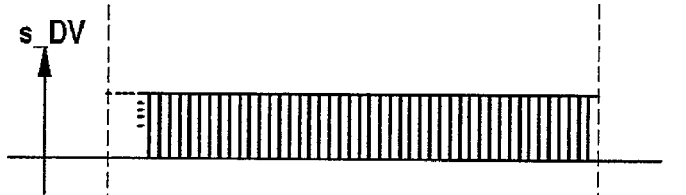
Figure 7D:

According to FIG. 7c the metering valve control signal s_DV is preferably started after turning off the bypass valve control signal s_By for the default of the diagnosis dosing operation. Alternatively the diagnosis dosing operation can be started also in this embodiment right at the diagnosis starting time ti_S.

The embodiment that is shown in FIG. 8a-8e is based on the idea that after turning off the pump 17 at the diagnosis starting time ti_S no diagnosis dosing operation is provided. When the pressure drop 60 falls below the threshold p_Lim until the diagnosis stopping time ti_E according to FIG. 8d during these proceedings, a leak in the exhaust gas treatment device 22 has to be assumed. If on the other hand the pressure drop 61 according to FIG. 8d occurs, at which after the abatement of the pressure loss caused by the leakage loss no further pressure drop occurs, an erroneous exhaust gas treatment device 22 can be assumed.

Figure 7E:
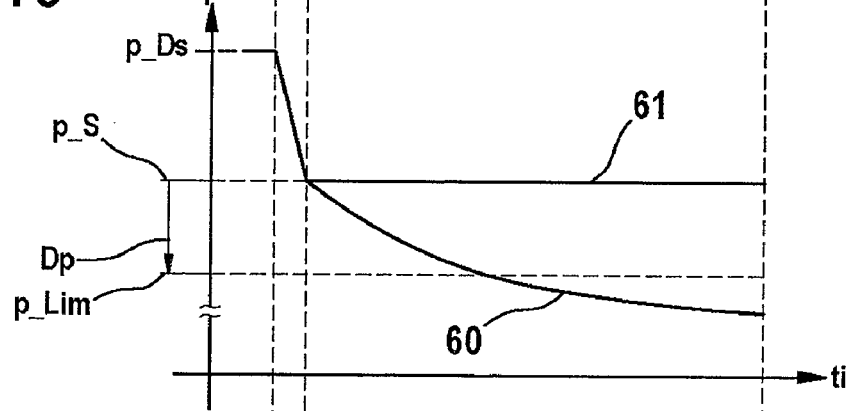
Figure 7F:
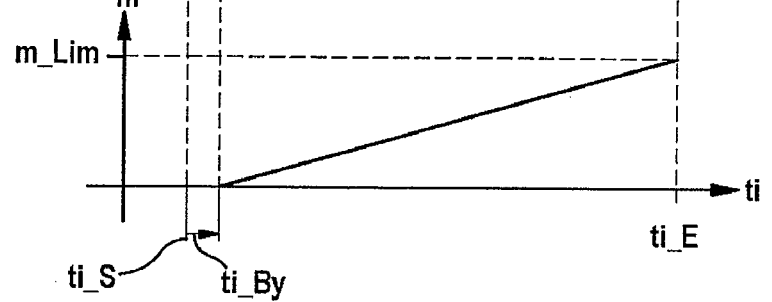
Figure 8A:
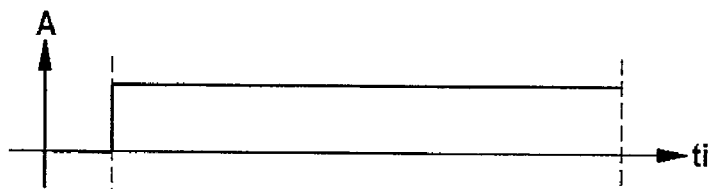
FIGS. 8a-8e show signal courses depending on the time, at which the leakage loss is eliminated by a bypass valve without a diagnosis dosing operation.
Figure 8B:
Figure 8C:
Figure 8D:
Figure 8E:
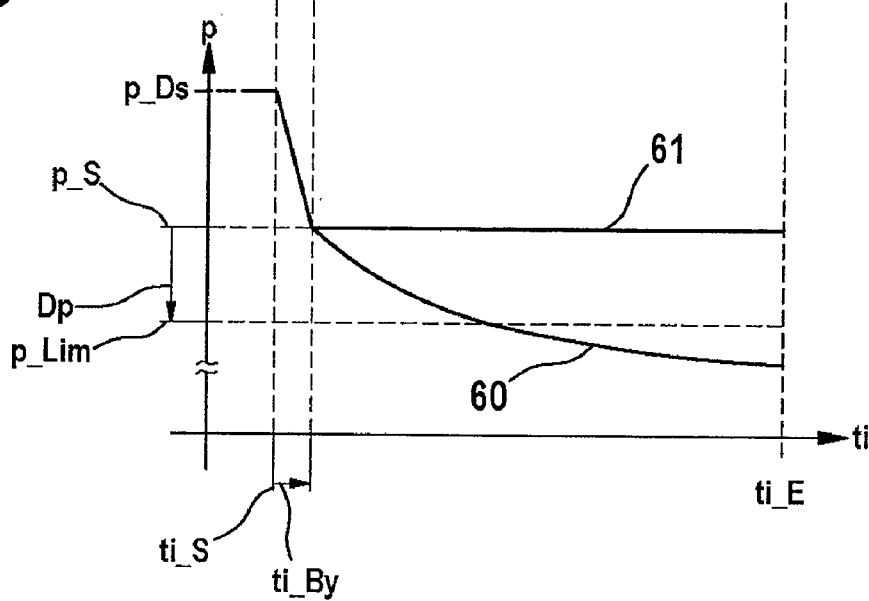

Because the diagnosis results act reversely with a diagnosis dosing operation and without a diagnosis dosing operation regarding the expected pressure drop 60, 61 according to FIGS. 7e and 8e, a rendering plausible can also be undertaken by a diagnosis course for one thing within the diagnosis dosing operation and for another thing without the diagnosis dosing operation.

In the embodiments, at which a diagnosis dosing operation is provided, the provision of the diagnosis stopping signal St can basically be dependent on the dosing amount m. the stopping signal determination 36 provides the diagnosis stopping signal St, when the dosed reagent amount reaches the reagent threshold m_Lim. With this measure the influence of the dosing amount on the diagnosis result is minimized.

The invention claimed is:

1. A method of diagnosing an exhaust gas treatment device that injects a reagent into an exhaust gas area of a combustion process, the method comprising:
    bringing the reagent to a dosing pressure with a pump;
    injecting the reagent with a metering valve;
    turning off the pump;
    determining a pressure drop evaluation parameter associated with a leakage loss of the pump;
    evaluating a pressure drop of the reagent using the pressure drop evaluation parameter;
    summing a reagent amount that is dosed during the diagnosis dosing operation;
    comparing the summed value to a dosing amount threshold; and
    terminating the evaluation of the pressure drop upon reaching the dosing amount threshold.

2. A method according to claim 1, further comprising:
    diagnosing the exhaust gas treatment device using a diagnosis dosing operation;
    diagnosing the exhaust gas treatment device without using the diagnosis dosing operation; and
    comparing a diagnosis result of the diagnosis performed with a diagnosis dosing operation to a diagnosis result of the diagnosis performed without a diagnosis dosing operation.

3. A method according to claim 1, wherein the pressure drop evaluation parameter is a pressure drop constant.

4. A method according to claim 1, wherein the pressure drop evaluation parameter is a waiting time after turning off the pump.

5. A method according to claim 1, wherein the pressure drop evaluation parameter is a determination of a gradient of the pressure drop.

6. A method according to claim 1, wherein the pressure drop evaluation parameter is an opening of a bypass valve.

7. A method according to claim 1, wherein evaluating a pressure drop of the reagent further comprises comparing a reagent pressure with a pressure threshold.

8. A method according to claim 1, further comprising determining a pressure threshold via an evaluation of a diagnosis starting pressure.

9. A method according to claim 8, further comprising determining a pressure threshold via an evaluation of a diagnosis pressure difference.

10. A device for the implementation of a method of diagnosing an exhaust gas treatment device that injects a reagent into an exhaust gas area of a combustion process, the method comprising:
    bringing the reagent to a dosing pressure with a pump;
    injecting the reagent with a metering valve;
    turning off the pump;
    determining a pressure drop evaluation parameter associated with a leakage loss of the pump;
    evaluating a pressure drop of the reagent using the pressure drop evaluation parameter;
    summing a reagent amount that is dosed during the diagnosis dosing operation;
    comparing the summed value to a dosing amount threshold; and
    terminating the evaluation of the pressure drop upon reaching the dosing amount threshold.

11. A control unit program to implement, if when the control unit program is executed on a control unit, a method of diagnosing an exhaust gas treatment device that injects a reagent into an exhaust gas area of a combustion process, the method comprising:
    bringing the reagent to a dosing pressure with a pump;
    injecting the reagent with a metering valve;
    turning off the pump;
    determining a pressure drop evaluation parameter associated with a leakage loss of the pump;
    evaluating a pressure drop of the reagent using the pressure drop evaluation parameter;
    summing a reagent amount that is dosed during the diagnosis dosing operation;
    comparing the summed value to a dosing amount threshold; and
    terminating the evaluation of the pressure drop upon reaching the dosing amount threshold.

12. A control unit program product with program code that is stored on a machine readable medium to implement, if when executed on a control unit, a method of diagnosing an exhaust gas treatment device that injects a reagent into an exhaust gas area of a combustion process, the method comprising:
    bringing the reagent to a dosing pressure with a pump;
    injecting the reagent with a metering valve;
    turning off the pump;
    determining a pressure drop evaluation parameter associated with a leakage loss of the pump;
    evaluating a pressure drop of the reagent using the pressure drop evaluation parameter;
    summing a reagent amount that is dosed during the diagnosis dosing operation;
    comparing the summed value to a dosing amount threshold; and
    terminating the evaluation of the pressure drop upon reaching the dosing amount threshold.

* * * * *

UNITED STATES PATENT AND TRADEMARK OFFICE
CERTIFICATE OF CORRECTION

| | | |
|---|---|---|
| PATENT NO. | : 8,132,449 B2 | |
| APPLICATION NO. | : 12/356298 | |
| DATED | : March 13, 2012 | |
| INVENTOR(S) | : Hartimath et al. | |

It is certified that error appears in the above-identified patent and that said Letters Patent is hereby corrected as shown below:

Col. 10, line 21, claim 11: "implement, if when the" should read --implement, when the--

Col. 10, line 40, claim 12: "to implement, if" should read --to implement,--

Signed and Sealed this
Thirtieth Day of October, 2012

David J. Kappos
*Director of the United States Patent and Trademark Office*